US010952184B2

(12) United States Patent
Fujishiro et al.

(10) Patent No.: US 10,952,184 B2
(45) Date of Patent: *Mar. 16, 2021

(54) RADIO TERMINAL AND BASE STATION COMMUNICATE SIMULTANEOUSLY THROUGH A PLURALITY OF CELLS

(71) Applicant: KYOCERA Corporation, Kyoto (JP)

(72) Inventors: Masato Fujishiro, Yokohama (JP); Yushi Nagasaka, Ritto (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,614

(22) Filed: Jul. 17, 2020

(65) Prior Publication Data

US 2020/0351835 A1   Nov. 5, 2020

Related U.S. Application Data

(63) Continuation of application No. 16/163,293, filed on Oct. 17, 2018, now Pat. No. 10,750,478, which is a
(Continued)

(51) Int. Cl.
*H04W 72/04*   (2009.01)
*H04W 76/11*   (2018.01)
*H04W 16/14*   (2009.01)

(52) U.S. Cl.
CPC .......... *H04W 72/04* (2013.01); *H04W 16/14* (2013.01); *H04W 76/11* (2018.02)

(58) Field of Classification Search
CPC ... H04W 72/04; H04W 72/042; H04W 76/11; H04W 76/10; H04W 16/14
See application file for complete search history.

(56) References Cited

U.S. PATENT DOCUMENTS

2012/0224552 A1   9/2012   Feuersanger et al.
2012/0250631 A1   10/2012   Hakola et al.
(Continued)

FOREIGN PATENT DOCUMENTS

JP   2015-144448 A   8/2015
WO   2014/163349 A1   10/2014

OTHER PUBLICATIONS

LG Electronics, "Motivation for New WI Cell-specific Operation in CA [COCA]", 3GPP RP-160050, Mar. 2016, 10 pages.
(Continued)

*Primary Examiner* — Ian N Moore
*Assistant Examiner* — Brian T Le
(74) *Attorney, Agent, or Firm* — Studebaker & Brackett PC

(57) ABSTRACT

A user equipment and method used in a user equipment include receiving from a base station, a message including information indicating a first logical channel associated with one or more first cells, information indicating a second logical channel with one or more second cells, and information associating the first logical channel and the second logical channel with a specific bearer of the user equipment. When transmitting data of the specific bearer, the data it transmitted by using the first logical channel in response to a volume of the data not exceeding a threshold value configured by the base station, and the data is transmitted by using the first logical channel and the second logical channel in response to the volume of the data exceeding the threshold value. A base station transmits the message and configures the threshold.

3 Claims, 9 Drawing Sheets

Related U.S. Application Data continuation of application No. PCT/JP2017/015703, filed on Apr. 19, 2017.

(60) Provisional application No. 62/326,134, filed on Apr. 22, 2016.

(56) References Cited

U.S. PATENT DOCUMENTS

2015/0373584 A1* 12/2015 Hong ............... H04W 28/08 370/329
2017/0142709 A1   5/2017 Lake et al.

OTHER PUBLICATIONS

Itri; "Issues of Uplink Split Bearer Configuration"; 3GPP TSG-RAN WG2 Meeting #91bis; Tdoc R2-154401; Oct. 5-9, 2015; total 4 pages; Malmö, Sweden.

Intel Corporation; "Uplink QoS Support for LAA"; 3GPP TSG-RAN WG2 #93bis; 3GPP R2-162469; Apr. 11-15, 2016; pp. 1-6; Dubrovnik, Croatia.

LG Electronics Inc.; "Logical Channel Prioritization in LAA"; 3GPP TSG-RAN WG2 #93bis; 3GPP R2-162858; Apr. 11-15, 2016; pp. 1-3; Dubrovnik, Croatia.

Ericsson; "Uplink for eLWA"; 3GPP TSG-RAN WG2 #93bis; 3GPP R2-162795; Apr. 11-15, 2016; pp. 1-6; Dubrovnik, Croatia.

Xinwei; "The BSR Design for the LWA Bearer"; 3GPP TSG RAN WG2 #93bis; 3GPP R2-162180; Apr. 11-15, 2016; pp. 1-6; Dubrovnik, Croatia.

Nokia et al.; "UL Support for LAA SCells"; 3GPP TSG-RAN WG2 #93bis; 3GPP R2-162669; Apr. 11-15, 2016; pp. 1-4; Dubrovnik, Croatia.

Ericsson; "Routing Restrictions in LAA"; 3GPP TSG-RAN WG2 #93bis; 3GPP R2-162748; Apr. 11-15, 2016; pp. 1-6; Dubrovnik, Croatia.

* cited by examiner

RADIO TERMINAL AND BASE STATION COMMUNICATE SIMULTANEOUSLY THROUGH A PLURALITY OF CELLS

CROSS-REFERENCE TO RELATED APPLICATIONS

The present application is a Continuation of U.S. patent application Ser. No. 16/163,293 filed Oct. 17, 2018, which is a continuation based on PCT Application No. PCT/JP2017/015703 filed on Apr. 19, 2017, which claims the benefit of U.S. Provisional Application No. 62/326,134 (filed on Apr. 22, 2016). The content of which is incorporated by reference herein in their entirety.

FIELD

The present disclosure relates to a radio terminal and a base station used in a mobile communication system.

BACKGROUND

In 3GPP (3rd Generation Partnership Project), which is a project aiming to standardize a mobile communication system, specifications of carrier aggregation, which is a technology in which a radio terminal communicates with a base station simultaneously through a plurality of cells (that is, a plurality of component carriers), have been provided.

The maximum number of cells in carrier aggregation in any release prior to 3GPP Release 13 (that is, the maximum number of cells to be aggregated) is 5. In contrast, the maximum number of cells in carrier aggregation in 3GPP Release 13 is increased to 32. Accordingly, in future, rather than a plurality of cells to be aggregated having similar characteristics, it is expected that cells having various characteristics are aggregated.

Further, in recent years, applications executed by radio terminals have been diversified, and characteristics required for traffic of each application have been diversified accordingly. Therefore, it is desired to realize a technology that makes it possible to match the characteristics of the cells to be aggregated and the characteristics of the traffic.

SUMMARY

A user equipment according to the present disclosure comprises a processor and a memory coupled to the processor. The processor is configured to perform a process of receiving from a base station, a message including information indicating a first logical channel associated with one or more first cells, information indicating a second logical channel with one or more second cells, and information associating the first logical channel and the second logical channel with a specific bearer of the user equipment. When transmitting data of the specific bearer, the processor is configured to perform a process of transmitting the data by using the first logical channel in response to a volume of the data not exceeding a threshold value configured by the base station, and a process of transmitting the data by using the first logical channel and the second logical channel in response to the volume of the data exceeding the threshold value.

A method according to the present disclosure that is used in a user equipment comprises receiving, from a base station, message including information indicating a first logical channel associated with one or more first cells, information indicating a second logical channel with one or more second cells, and information associating the first logical channel and the second logical channel with a specific bearer of the user equipment. The method comprises transmitting data of the specific bearer. Transmitting the data of the specific bearer comprises transmitting the data by using the first logical channel in response to a volume of the data not exceeding a threshold value configured by the base station, and transmitting the data by using the first logical channel and the second logical channel in response to the volume of the data exceeding the threshold value.

A base station according to the present disclosure comprises a processor and a memory coupled to the processor. The processor is configured to perform a process of transmitting to a user equipment a message including information indicating a first logical channel associated with one or more first cells, information indicating a second logical channel with one or more second cells, and information associating the first logical channel and the second logical channel with a specific bearer of the user equipment. The processor is configured to perform a process of configuring a threshold value to the user equipment so that, when transmitting data of the specific bearer, the user equipment transmits the data by using the first logical channel in response to a volume of the data not exceeding the threshold value, and transmits the data by using both of the first logical channel and the second logical channel in response to the volume of the data exceeding the threshold value.

DESCRIPTION OF THE EMBODIMENT (Mobile Communication System)

Figure 1:
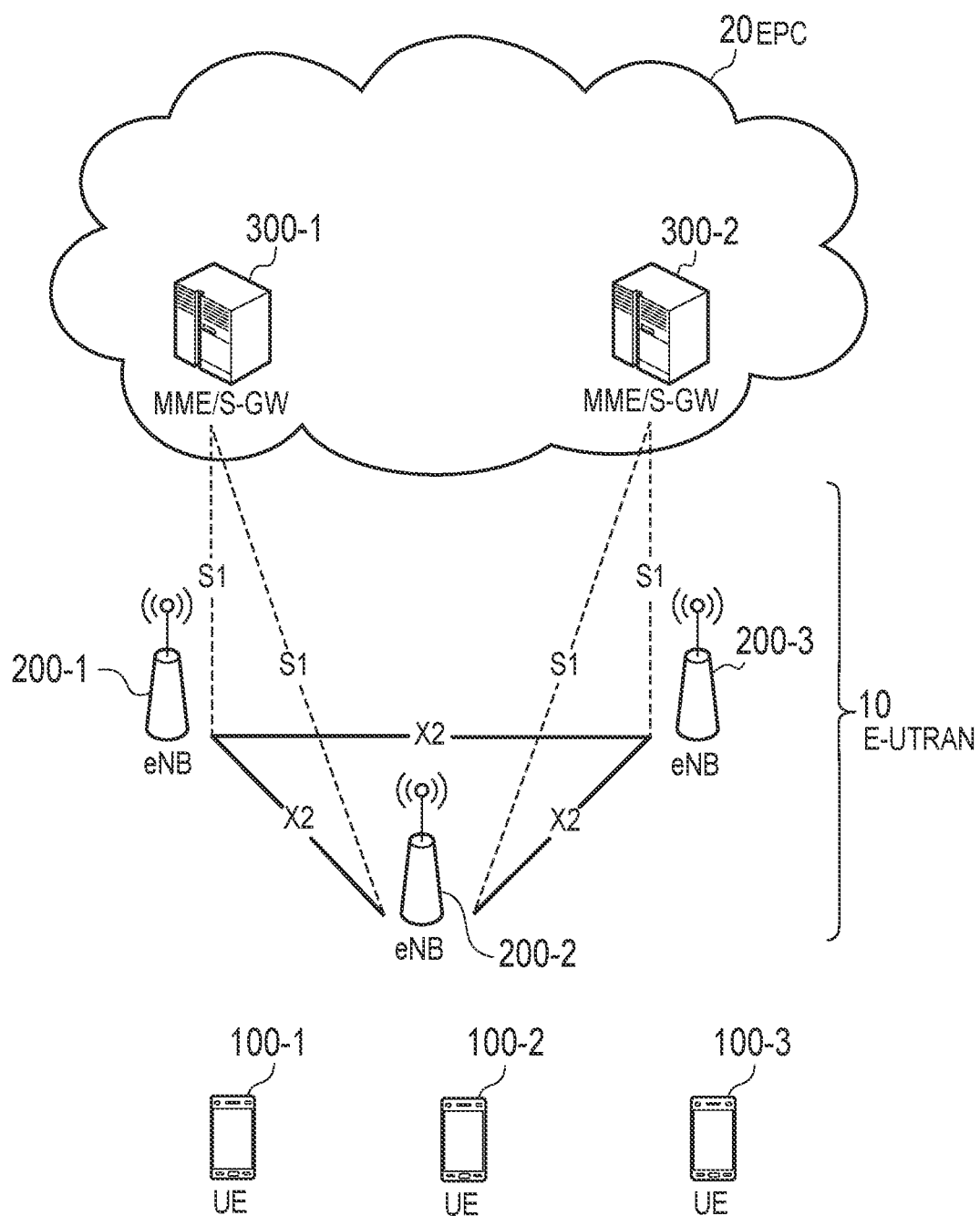
FIG. 1 is a diagram illustrating a configuration of an LTE system according to an embodiment.

Hereinafter, the configuration of the mobile communication system according to the embodiment will be described. FIG. 1 is a diagram showing a configuration of an LTE (Long Term Evolution) system which is a mobile communication system according to the embodiment. The LTE system is a mobile communication system based on the 3rd Generation Partnership Project (3GPP) standard.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device. The UE 100 performs communication with a cell (a serving cell).

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area. The "cell" is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface.

Figure 2:
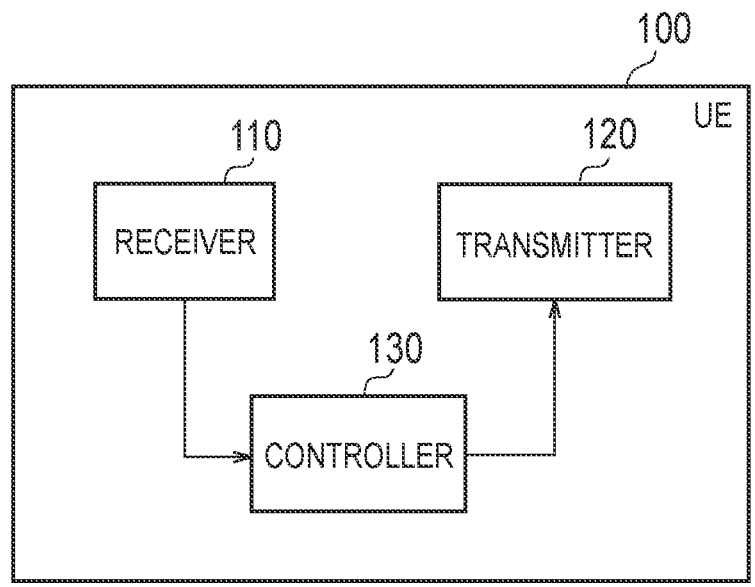
FIG. 2 is a diagram illustrating a configuration of a UE (radio terminal) according to the embodiment.

FIG. 2 is a diagram of the configuration of UE 100 (radio terminal). As illustrated in FIG. 2, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130.

The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be utilized for a process by the processor. The processor includes a baseband processor and a CPU (Central Processing Unit). The baseband processor performs modulation and demodulation, encoding and decoding and the like of a baseband signal. The CPU performs various processes by executing the program stored in the memory. The processor executes below-described processes.

Figure 3:
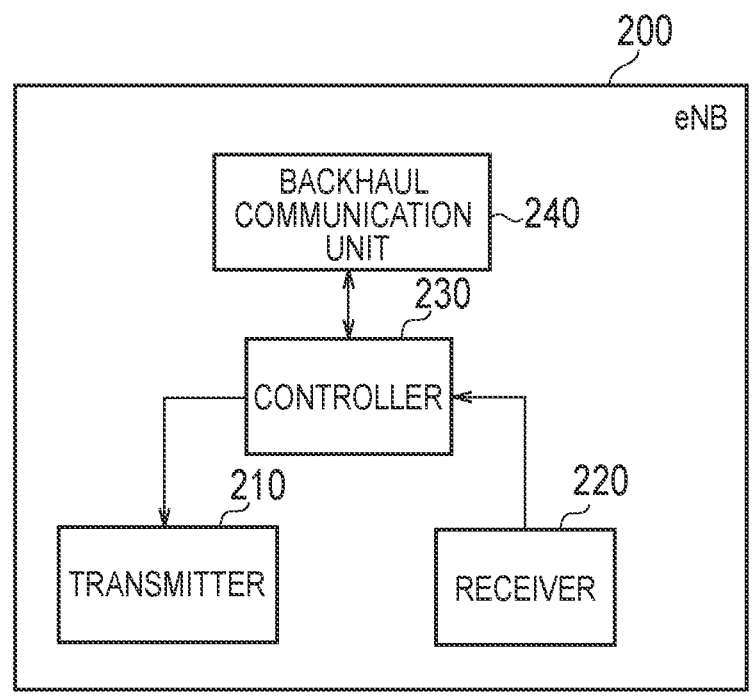
FIG. 3 is a diagram illustrating a configuration of an eNB (base station) according to the embodiment.

FIG. 3 is a diagram illustrating configuration of the eNB 200 (base station). As illustrated in FIG. 3, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program to be executed by the processor, and information to be utilized for a process by the processor. The processor includes a baseband processor and a CPU. The baseband processor performs modulation and demodulation, encoding and decoding and the like of a baseband signal. The CPU performs various processes by executing the program stored in the memory. The processor executes below-described processes.

The backhaul communication unit 240 is connected to a neighboring eNB 200 via the X2 interface. The backhaul communication unit 240 is connected to the MME/S-GW 300 via the S1 interface. The backhaul communication unit 240 is used for communication performed on the X2 interface, communication performed on the S1 interface, and the like.

Figure 4:
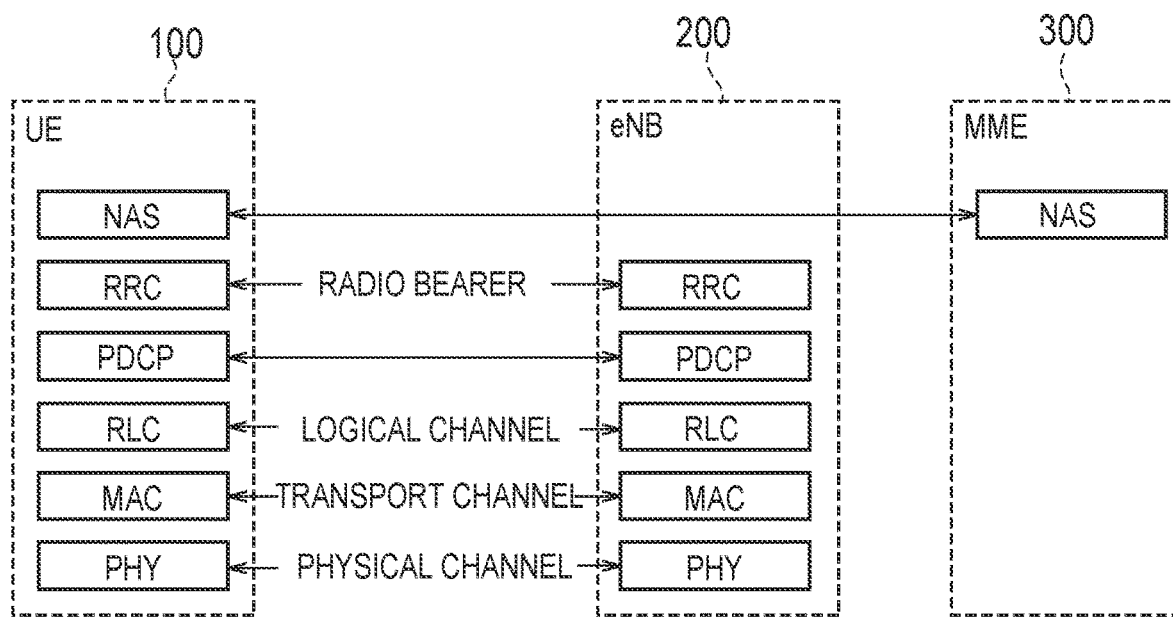
FIG. 4 is a diagram illustrating a configuration of a protocol stack of a radio interface according to the embodiment.

FIG. 4 is a diagram illustrating protocol stack of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control information are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control information are transmitted via a transport channel. The MAC layer of the eNB 200 includes a scheduler. The scheduler determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control information are transmitted via a logical channel.

The PDCP layer performs header compression and decompression, and encryption and decryption.

The RRC layer is defined only in a control plane dealing with control information. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

Figure 5:
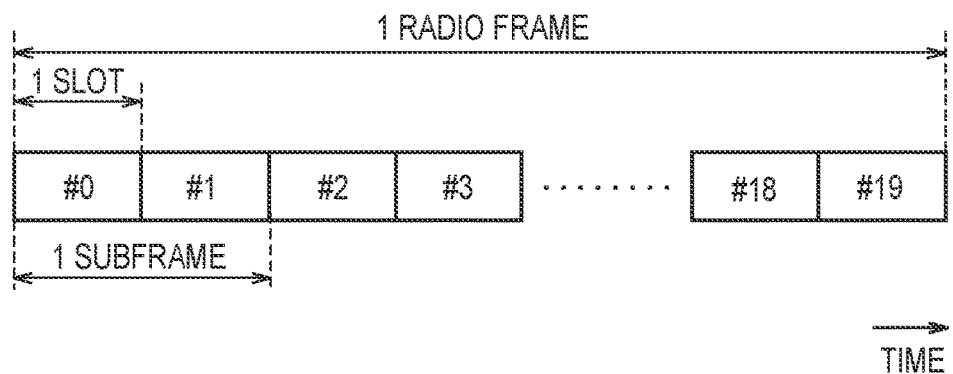
FIG. 5 is a diagram illustrating a configuration of a radio frame according to the embodiment.

FIG. 5 is a configuration diagram of a radio frame used in the LTE system. As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

(Carrier Aggregation)

Carrier aggregation will be described. The mobile communication system according to the embodiment supports carrier aggregation. In carrier aggregation, a plurality of component carriers are aggregated to ensure a wider transmission bandwidth. The UE 100 performs transmission or reception simultaneously on the plurality of component carriers.

The UE 100 for which carrier aggregation is configured has a single RRC connection with the network. When an RRC connection setup, re-setup, or a handover is executed, a single serving cell provides NAS mobility information to the UE 100. Further, when the RRC connection re-setup or the handover is executed, the single serving cell provides security information (security input) to the UE 100. The single serving cell is referred to as a primary cell. A component carrier corresponding to the primary cell is referred to as a primary component carrier. The primary cell is changed by a handover.

A secondary cell is set with the primary cell so that a set of serving cells is formed. A component carrier corresponding to the secondary cell is referred to as a secondary component carrier. The number of available serving cells depends on the carrier aggregation capability of the UE 100. Setting (addition) and removal of the secondary cell is performed on the RRC layer (by an RRC entity).

Activation and deactivation of the set secondary cell is performed on the MAC layer (by a MAC entity). Specifically, the MAC entity of the eNB 200 transmits an activation/deactivation MAC control element to the UE 100 to perform the activation/deactivation of the set secondary cell. It is not possible to deactivate the primary cell. The MAC entity of the UE 100 has a deactivation timer to be set by the RRC entity. The MAC entity of the UE 100 starts the deactivation timer when the secondary cell is activated. The MAC entity of the UE 100 deactivates the secondary cell in response to expiration of the deactivation timer.

A plurality of serving cells which are set may be grouped into a timing advance group (TAG) of cells having the same timing advance (TA). The UE 100 can perform simultaneous transmission and reception of a plurality of serving cells by applying a different timing advance to each timing advance group.

Figure 6:
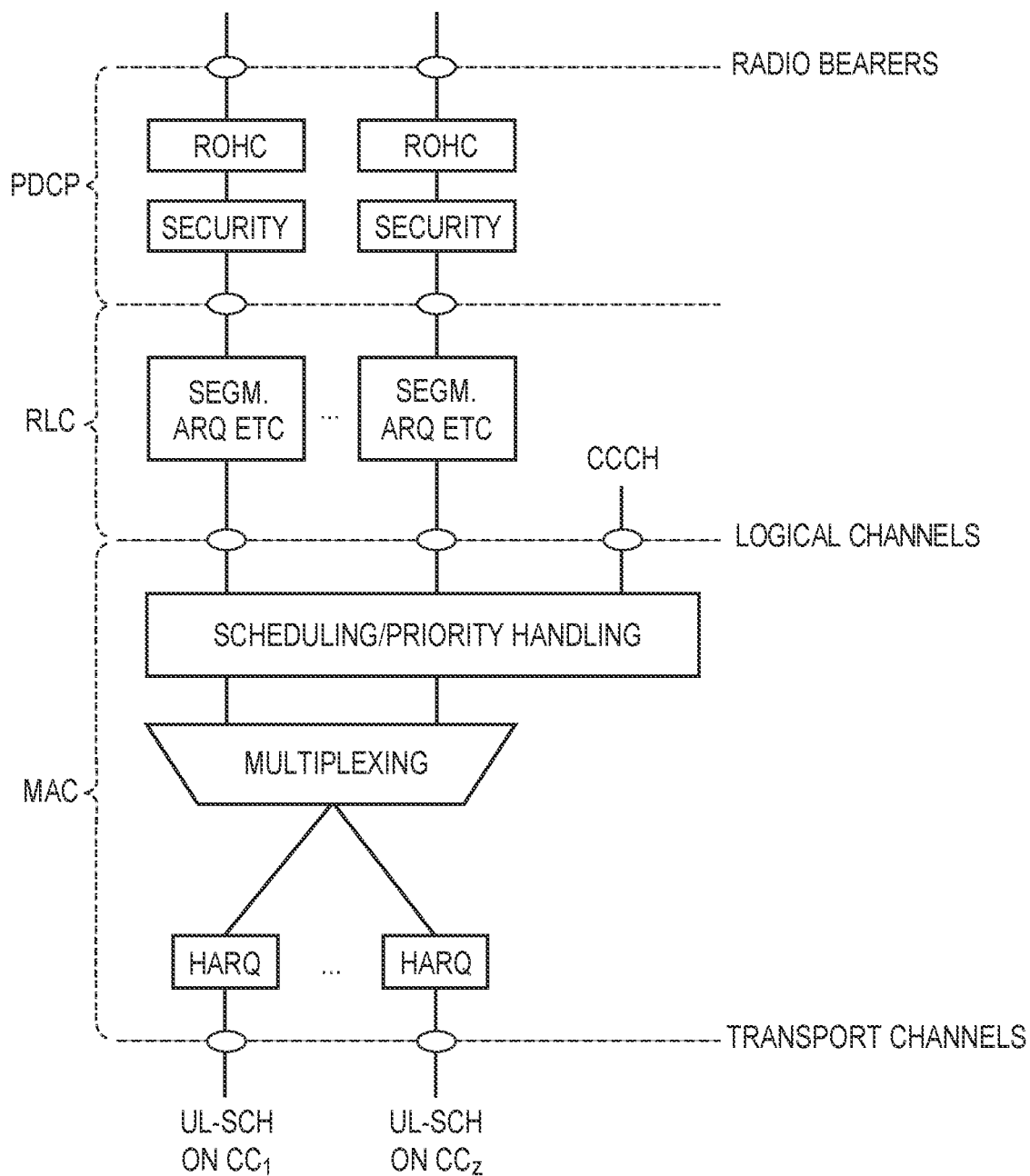
FIG. 6 is a diagram illustrating the second layer (Layer 2) structure in the UE for which carrier aggregation is configured.

FIG. 6 is a diagram illustrating the second layer (Layer 2) structure in the UE 100 for which carry aggregation is configured. Here, an operation relating to an uplink is mainly described.

As illustrated in FIG. 6, a PDCP entity and an RLC entity of the UE 100 process data of a plurality of radio bearers. The MAC entity processes data of a plurality of logical channels corresponding to the plurality of radio bearers. The maximum number of radio bearers (logical channel) is 8. A data radio bearer is added to ToAddModList of RadioResourceConfigDedicated, which is a type of RRC signaling, and the upper limit number of data radio bearers is eight. Likewise, a signaling radio bearer is also added, and three signaling radio bearers are eventually established.

The MAC entity of the UE 100 groups a plurality of logical channels into four LCGs (Logical Channel Group). The MAC entity of the UE 100 manages an amount of retained data for each LCG as a buffer status, and transmits a buffer status report to the eNB 200. The amount of retained data may be referred to as "amount of data available for transmission."

The MAC entity of the UE 100 performs priority setting (scheduling/priority handling) on the plurality of logical channels so as to preferentially transmit a logical channel with a higher priority by using an uplink radio resource allocated by the eNB 200. The MAC entity of the UE 100 performs multiplexing on data of the logical channels on which the priority setting has been performed, and provides the resulting data to a physical layer entity through an HARQ entity. There exists a single HARQ entity in each serving cell. A transport block generated by each HARQ entity is mapped with a single serving cell. Such a procedure for the MAC entity is referred to as logical channel prioritization.

It is noted that as an advanced technology of carrier aggregation, there is a known technology called dual connectivity. In the dual connectivity, the UE 100 has a connection to a master eNB and a secondary eNB, and communicates with them simultaneously through a cell group of the master eNB (master cell group) and a cell group of the secondary eNB (secondary cell group). The UE 100 has the RRC connection only with the master eNB, and performs transmission to and reception from the master eNB through RRC signaling.

First Embodiment

A first embodiment will be described. The first embodiment to a fourth embodiment are embodiments mainly relating to "logical channel prioritization" in carry aggregation.

Figure 7:
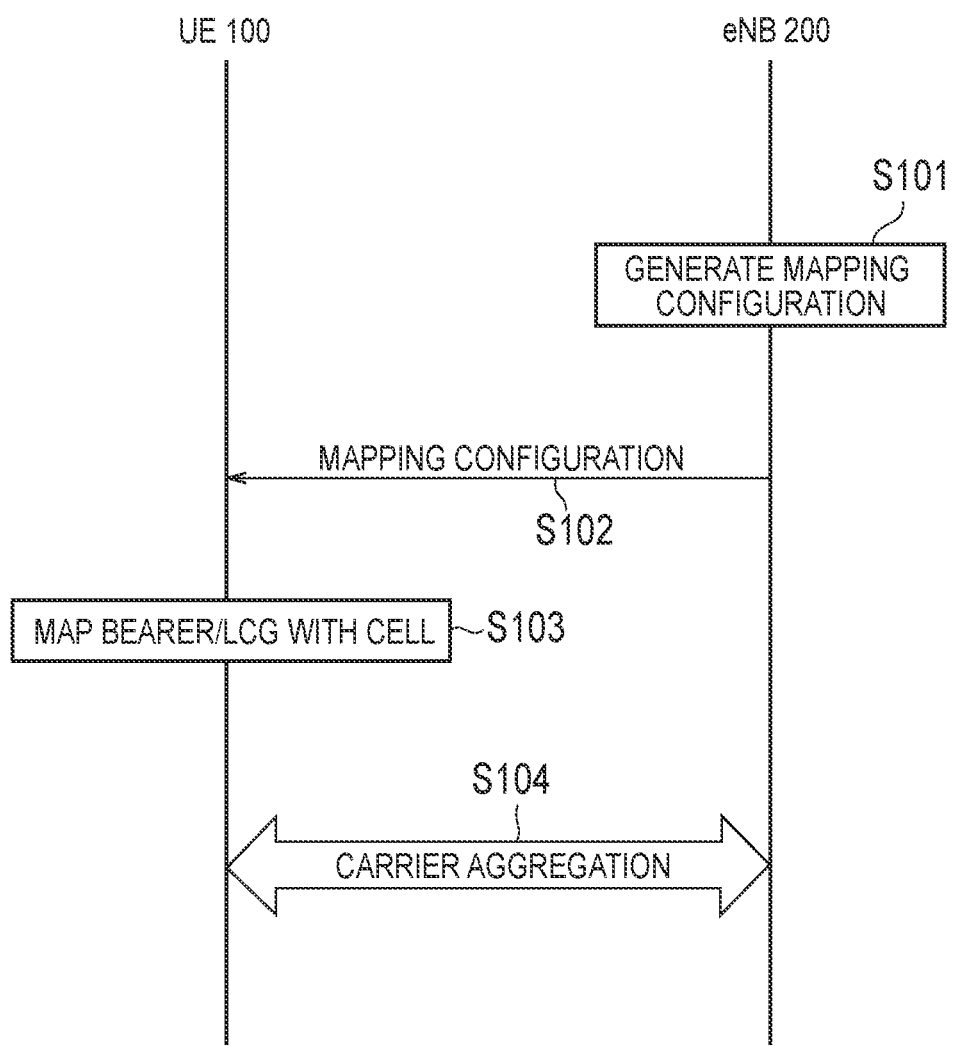
FIG. 7 is a diagram illustrating operations of the UE and the eNB according to a first embodiment.

FIG. 7 is a diagram illustrating operations of the UE 100 and the eNB 200 according to the first embodiment. In an initial state in FIG. 7, the UE 100 is in a state where an RRC connection with the eNB 200 has been established (that is, the RRC connected mode).

As illustrated in FIG. 7, in step S101, the eNB 200 generates a mapping configuration. The mapping configuration is for setting a mapping between a specific bearer or a specific LCG and one or more specific cells of the UE 100. The bearer is a radio bearer (RB). The radio bearer may be a data radio bearer (DRB). The specific cell is a cell that is a serving cell of the UE 100 and is also used in the carrier aggregation. The specific cell may be a secondary cell to be set in the UE 100.

As an example, the eNB 200 generates the mapping configuration such that the characteristics of the secondary cell to be set in the UE 100 and the characteristics of the traffic (bearer or LCG) are matched. The characteristics of the cell include information indicating whether it is an unlicensed spectrum cell, and/or a load status (radio load, backhaul load), and the like. The unlicensed spectrum cell may be referred to as an LAA (Licensed Assisted Access) cell. The characteristics of the traffic may be QoS (Quality of Service) characteristics such as information indicating whether it is a traffic required to have low delay. The eNB 200 can generate the mapping configuration such that a bearer or an LCG required to have high QoS is mapped with a licensed spectrum cell. Further, the eNB 200 can generate the mapping configuration such that a bearer or an LCG not required to have high QoS is mapped with an unlicensed spectrum cell (LAA cell).

In step S102, the eNB 200 transmits the mapping configuration to the UE 100. The eNB 200 may transmit the mapping configuration to the UE 100 by RRC signaling on the primary cell. The RRC signaling may be UE-dedicated RRC signaling (dedicated signaling). The mapping configuration may include a combination of a bearer ID and a cell ID or a combination of an LCG ID and a cell ID. It is noted that the bearer ID may be replaced with a logical channel ID because the bearer and the logical channel has a one-to-one relationship. When setting (adding) the secondary cell to the UE 100, the eNB 200 may transmit, to the UE 100, the mapping configuration including a bearer ID or an LCG ID to be mapped with the secondary cell.

In step S102, the UE 100 receives the mapping configuration from the eNB 200.

In step S103, the UE 100 maps, based on the mapping configuration, its own specific bearer or specific LCG with one or more specific cells. The MAC entity of the UE 100 may obtain the combination of the bearer ID and the cell ID included in the mapping configuration from the RRC entity to map the bearer ID with the cell ID. Alternatively, the MAC entity of the UE 100 may obtain the combination of the LCG ID and the cell ID included in the mapping configuration from the RRC entity to map the LCG identified by the LCG ID with the cell identified by the cell ID.

In step S104, the eNB 200 and the UE 100 perform carrier aggregation communication simultaneously through a plurality of cells (a plurality of serving cells). The UE 100 transmits data of the specific bearer or the specific LCG on one or more particular cells corresponding to the specific bearer or the specific LCG.

Thus, according to the first embodiment, it is possible to match the characteristics of the cell to be aggregated and the characteristics of the traffic. Further, it is preferable to map the LCG not the bearer with the cell because the number of LCGs, "4" is half as compared to the number of bearers, "8." Accordingly, as compared to the case where the bearer is mapped with the cell, it is possible to reduce the complexity of the control and setting by half.

Figure 8:
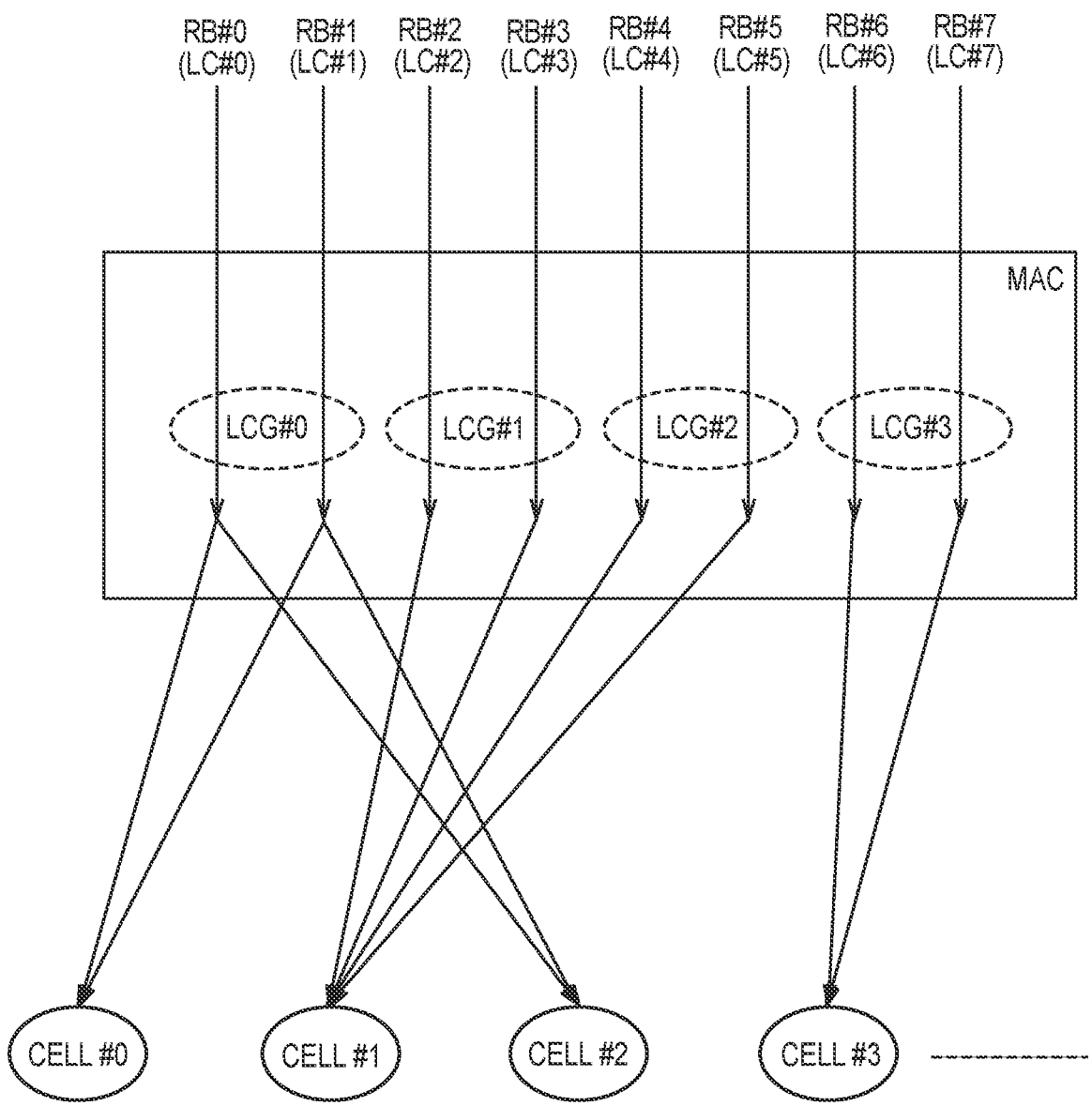
FIG. 8 is a diagram illustrating an example of "logical channel prioritization" according to the first embodiment.

FIG. 8 is a diagram illustrating an example of "logical channel prioritization" according to the first embodiment. Here, an example of mapping an LCG with a cell is described. In FIG. 8, a radio bearer is represented as RB, and a logical channel is represented by LC. Cells #0, #1, #2, . . . may be replaced with HARQ entities #0, #1, #2, . . . .

As illustrated in FIG. 8, RB #0 (LC #0) and RB #1 (LC #1) belong to LCG #0; RB #2 (LC #2) and RB #3 (LC #3) belong to LCG #1; RB #4 (LC #4) and RB #5 (LC #5) belong to LCG #2; and RB #6 (LC #6) and RB #7 (LC #7) belong to LCG #3. However, mapping RB (LC) with LCG is not limited to the example of FIG. 8 because the mapping is set by the eNB 200.

The MAC entity of the UE 100 maps the LCG with the cell based on the mapping configuration, and performs a process of transmitting data of the LCG on the corresponding cell. In the example of FIG. 8, the MAC entity of the UE 100 maps LCG #0 with Cell #0 and Cell #2, and performs a process of transmitting data of LCG #0 on Cell #0 and Cell #2 accordingly. The MAC entity of the UE 100 maps LCG #1 with Cell #1, and performs a process of transmitting data of LCG #1 on Cell #1 accordingly. The MAC entity of the UE 100 maps LCG #2 with Cell #1, and performs a process of transmitting data of LCG #2 on Cell #1 accordingly. The MAC entity of the UE 100 maps LCG #3 with Cell #3, and performs a process of transmitting data of LCG #3 on Cell #3 accordingly.

Modification of First Embodiment

A modification of the first embodiment will be described with a particular focus on differences from the first embodiment.

In the first embodiment, the one or more specific cells indicated by the mapping configuration are cells (allowed cells) on which the UE 100 is allowed to perform transmission. Under this condition, when a problem (radio problem) occurs in the one or more specific cells, the UE 100 is difficult to transmit the data of the corresponding specific bearer or the specific LCG.

In the modification of the first embodiment, the one or more specific cells indicated by the mapping configuration are cells (prohibited cells) on which the UE 100 is prohibited from performing transmission. In other words, the mapping configuration is for setting mapping the specific bearer or the specific LCG of the UE 100 with one or more prohibited cells. The UE 100 prohibits, based on the mapping configuration, data of the specific bearer from being transmitted on a prohibited cell corresponding to the specific bearer. That is, the UE 100 transmits the data of the specific bearer on a cell other than the prohibited cell corresponding to the specific bearer. Alternatively, the UE 100 prohibits, based on the mapping configuration, data of the specific LCG from being transmitted on a prohibited cell corresponding to the specific LCG. That is, the UE 100 transmits the data of the particular LCG on a cell other than the prohibited cell corresponding to the specific LCG. The cell other than the prohibited cell may be a serving cell that the UE 100 has selected autonomously.

As an example, the eNB 200 generates the mapping configuration such that a non-GBR (Guaranteed Bit Rate) bearer such as Web browsing does not use any licensed spectrum cell. This makes it possible to reduce the load of the licensed spectrum cell. As another example, the eNB 200 generates the mapping configuration such that a bearer required to have high QoS, such as an emergency VoLTE (Voice over LTE) call does not use any unlicensed spectrum cell (LAA cell). This makes it possible to properly transmit data of the bearer required to have high QoS.

Second Embodiment

A second embodiment will be described with a particular focus on differences from the first embodiment.

In the first embodiment, when a problem occurs in the specific cell indicated by the mapping configuration, the UE 100 is difficult to transmit data of the corresponding specific bearer or specific LCG.

It is thought that a first method for solving this problem is a method of causing the eNB 200 to start RRC connection reconfiguration that reuses the existing mechanism of RLF (Radio Link Failure) and changes the mapping between the bearer (or LCG) and the cell. Here, the RRC connection reconfiguration may be for removing a cell in which the problem occurs, or adding a healthy cell to the mapping configuration. However, in the existing mechanism of RLF, only the primary cell is to be monitored, and the secondary cell is out of scope.

It is also thought that a second method is a method of leaving to the implementation of the eNB 200. For example, when uplink transmission of the UE 100 is not performed after a UL grant is transmitted, the eNB 200 determines that the specific cell does not work.

In any of the first and second methods, the detection of any problem is delayed, and it is also necessary to perform the RRC connection reconfiguration. As a result, a degradation of service quality and/or an increase in signaling overhead are caused.

The UE 100 according to the second embodiment determines that a problem occurs in the one or more specific cells, in response to the amount of retained data (stacked data amount) or the retention time of data (data stacked duration) exceeding a threshold value set by the eNB 200. The threshold value may be set by UE-dedicated RRC signaling or broadcast RRC signaling. This makes it possible to quickly detect a problem occurring in the secondary cell without depending on the existing mechanism of RLF.

Alternatively, the existing mechanism of RLF may be extended to the secondary cell to allow an RLM (Radio Link Monitoring) function to detect a problem occurring in the secondary cell.

Then, in response to determining that a problem occurs in the specific cell, the UE 100 transmits data (stacked data) on an alternative cell other than the specific cell in which the problem occurs. This makes it possible to continue the data transmission without performing the RRC connection reconfiguration. It is noted that the alternative cell (exceptional cell) is a cell that is determined by RRC setting, a primary cell, a cell that is allocated an uplink resource (that is, a cell having transmitted the UL grant), or a cell that is selected autonomously by the UE 100. Further, the UE 100 may transmit, in response to determining that a problem occurs in the specific cell, a notice (indication) relating to the problem to the eNB 200. The UE 100 transmits the notice, for example, on the primary cell. The notice may include the ID of the cell in which the problem occurs, the ID of the bearer corresponding to the cell, or the ID of the LCG corresponding to the cell.

Figure 9:
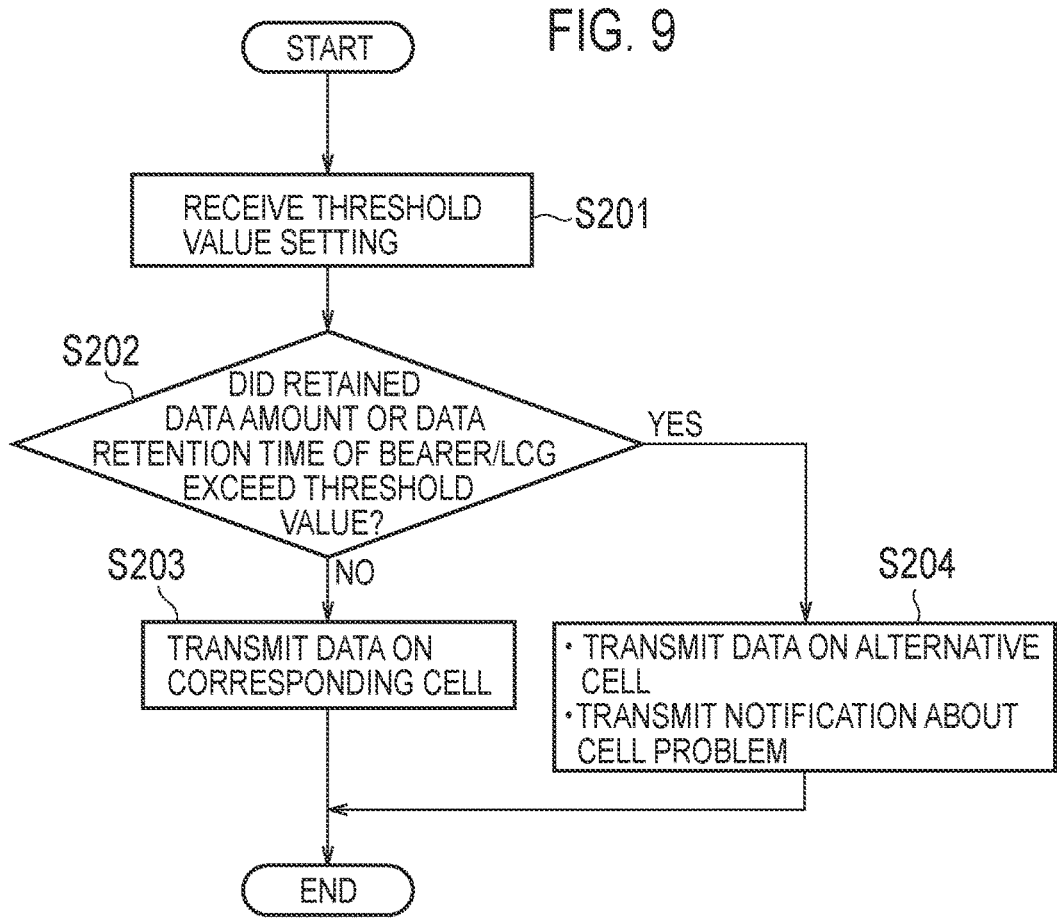
FIG. 9 is a diagram illustrating an example of an operation of the UE according to a second embodiment.

FIG. 9 is a diagram illustrating an example of an operation of the UE 100 according to the second embodiment.

As illustrated in FIG. 9, in step S201, the UE 100 receives a setting for the threshold value from the eNB 200 by RRC signaling. The threshold value is a threshold value for the amount of retained data or a threshold value for the retention time of data. As an example, the eNB 200 sets a common threshold value among the respective bearers (or LCGs) by broadcast RRC signaling. Alternatively, the eNB 200 may set a threshold value individually for each bearer (or LCG) by UE-dedicated RRC signaling.

In step S202, the UE 100 monitors its own uplink buffer to obtain the amount of retained data or the retention time of data of its own bearer (or LCG). The UE 100 compares the obtained amount of retained data or the obtained retention time of data with the threshold value. In a case of comparing the amount of retained data with the threshold value, the UE 100 may take into account an uplink radio resource allocated in the corresponding cell. For example, the UE 100 may compare a value obtained by subtracting the amount of the allocated uplink radio resource from the amount of retained data with the threshold value. Thus, in a case where many VoLTE packets retain while the packets just wait for transmission opportunities by SPS, it is possible to avoid an excessive estimate of the amount of retained data.

If the amount of retained data or the retention time of data does not exceed the threshold value (step S202: NO), then the UE 100 determines that no problem occurs in the corresponding cell. Then, in step S203, the UE 100 performs a process of transmitting data of the bearer (or LCG) on the corresponding cell.

If the amount of retained data or the retention time of data exceeds the threshold value (step S202: YES), the UE 100 determines that a problem occurs in the corresponding cell. Then, in step S204, the UE 100 performs a process of transmitting the data of the bearer (or LCG) on an alternative cell. Further, the UE 100 may transmit a notice (indication) relating to the problem to the eNB 200.

Third Embodiment

A third embodiment will be described with a particular focus on differences from the first and second embodiments.

In the third embodiment, it is assumed that the bearer and the cell are mapped with each other, that is, the mapping configuration is for setting a mapping between the specific bearer and one or more specific cells. In such a case, it is desirable that the eNB 200 can obtain the amount of retained data (buffer status) of each bearer in the UE 100. In particular, when a problem occurs in a specific cell, it is desirable that the eNB 200 can obtain the amount of retained data of the bearer corresponding to the specific cell in which the problem occurs.

The UE 100 according to the third embodiment transmits a buffer status report indicating the amount of retained data per bearer not per LCG to the eNB 200. The buffer status report according to the third embodiment may be an extension of an existing long BSR. It is noted that the BSR is a kind of MAC control element. In this case, the buffer status report according to the third embodiment may be referred to as an extra long BSR.

Figure 10:
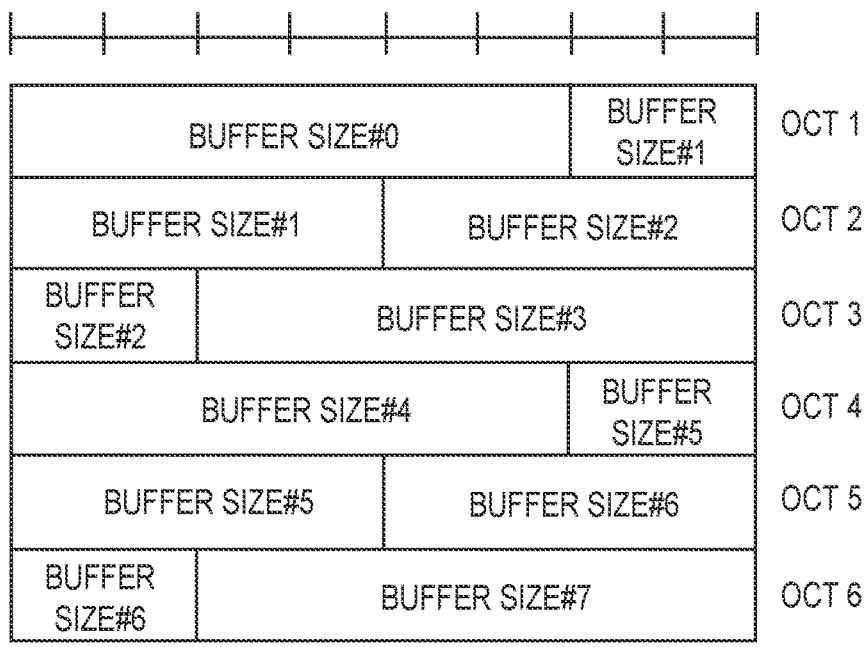
FIG. 10 is a diagram illustrating an example of an extra long BSR according to a third embodiment.

FIG. 10 is a diagram illustrating an example of the extra long BSR according to the third embodiment.

As illustrated in FIG. 10, the extra long BSR has eight fields containing eight buffer statuses (Buffer Size #0 to Buffer Size #7). Each field is mapped with a bearer ID (or logical channel ID). That is, Buffer Sizes #0 to #7 correspond to bearers #0 to #7 (or logical channels #0 to #7), respectively. In the example of FIG. 10, the extra long BSR has a data size that is a length of 6 octets. To reduce the data size of the extra long BSR, the buffer status indicated by the extra long BSR may be rougher (that is, have a lower precision) than the existing long BSR. The buffer status indicated by the extra long BSR may be only the lower bits (e.g., LSB) of a value indicating the amount of retained data per bearer.

Alternatively, the buffer status report according to the third embodiment may be an extension of an existing short BSR. In this case, the buffer status report according to the third embodiment has a field containing a single bearer ID (or a single logical channel ID) and a field containing a buffer status corresponding to the single bearer ID (or the single logical channel ID).

The buffer status report according to the third embodiment may further have a field containing a cell ID corresponding to the bearer ID (or logical channel ID). As an example, the extra long BSR may have eight fields for cell ID corresponding to eight bearer IDs (or eight logical channels IDs). Alternatively, if the existing short BSR is extended, the buffer status report may have a single field for cell ID corresponding to a single bearer ID (or a single logical channel ID).

In response to detecting a problem of a specific cell (secondary cell), the UE 100 may transmit the buffer status report according to the third embodiment on the primary cell. Instead of the transmission on the primary cell, the transmission on the alternative cell (exceptional cell) according to the second embodiment (exceptional cell) may be used. Alternatively, the UE 100 may transmit the buffer status report according to the third embodiment in response to receiving a request from the eNB 200.

The eNB 200 may determine an uplink radio resource that is allocated to the UE 100 by a serving cell other than the cell in which a problem occurs, or may set a new secondary cell in the UE 100, based on the cell ID and the buffer status included in the buffer status report. Alternatively, in a case of the dual connectivity, the master eNB that has received the buffer status report may transfer the buffer status report to the secondary eNB on the X2 interface.

In a case where the number of LCGs is extended from 4 to 8, the extra long BSR according to the third embodiment may indicate the amount of retained data (buffer status) per LCG.

Fourth Embodiment

A fourth embodiment will be described with a particular focus on differences from the first embodiment to the third embodiment.

The embodiments described above do not mention, in the case where one specific bearer is mapped with a plurality of specific cells, about how to allocate data of the specific bearer to each specific cell.

The UE 100 according to the fourth embodiment determines a specific cell to be used for transmission of data of the specific bearer out of the plurality of specific cells, based on priorities set on the plurality of specific cells. For example, the plurality of specific cells include a first specific cell, and a second specific cell having a lower priority than the first specific cell. In response to the amount of the retained data of the specific bearer not exceeding the threshold value set by the eNB 200, the UE 100 performs a process of transmitting data by using only the first specific cell. The priorities and the threshold value may be set by RRC signaling from the eNB 200. In response to the amount of the retained data of the specific bearer exceeding the threshold value, the UE 100 performs a process of transmitting data by using both the first specific cell and the second specific cell. In response to determining that the second specific cell is used for transmission of data, the UE 100 may transmit the buffer status report indicating the amount of the retained data of the specific bearer to the eNB 200.

Figure 11:
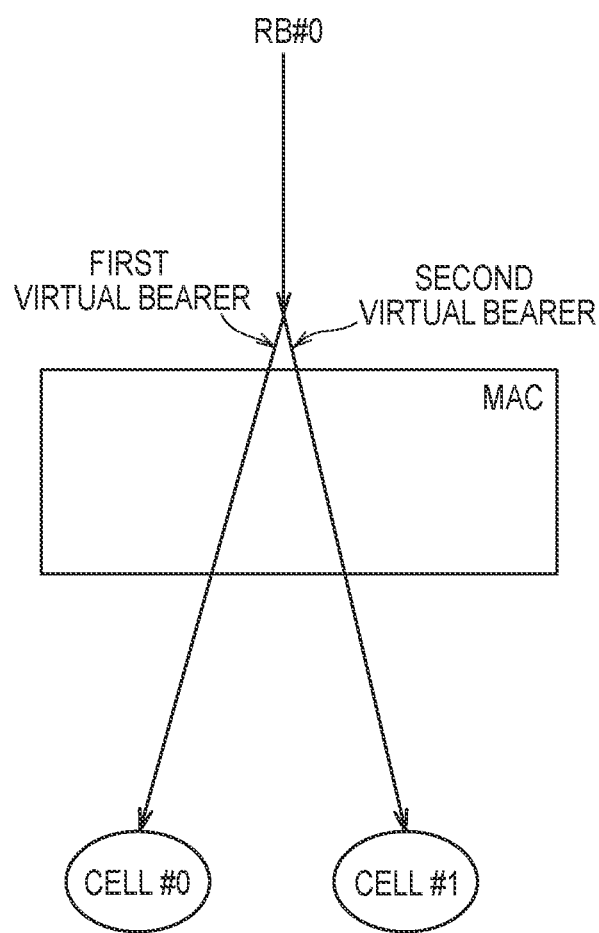
FIG. 11 is a diagram illustrating an example of an operation of the UE according to a fourth embodiment.

FIG. 11 is a diagram illustrating an example of an operation of the UE 100 according to the fourth embodiment.

As illustrated in FIG. 11, the UE 100 divides the specific bearer (RB #0) into two virtual bearers. The division of the bearer is performed by the PDCP entity, the RLC entity, or the MAC entity of the UE 100. The first virtual bearer is mapped with a first specific cell (Cell #0), and the second virtual bearer is mapped with a second specific cell (Cell #1). Such settings may be performed by RRC signaling by the eNB 200. Specifically, the eNB 200 sets, in the UE 100, a high priority cell constantly used (that is, the first specific cell) and a low priority cell temporarily used (that is, the second specific cell). It is noted that the eNB 200 may set, in the UE 100, information indicating whether to divide each bearer of the UE 100.

For example, the PDCP entity distributes data of RB #0 to the first virtual bearer (Cell #0) and the second virtual bearer (Cell #1). In a normal state, the UE 100 transmits data by using the first virtual bearer (Cell #0), and deactivates the second virtual bearer (Cell #1). The UE 100 monitors the uplink buffer to grasp the amount of retained data of RB #0 (buffer status).

In response to the amount of retained data exceeding the threshold value, the UE 100 activates the second virtual bearer (Cell #1). The activation of the second virtual bearer (Cell #1) is implicitly performed. That is, the eNB 200 determines, based on the buffer status report from the UE 100, that the second virtual bearer (Cell #1) is activated. Assuming that the eNB 200 sets the threshold value, the eNB 200 can determine whether the second virtual bearer (Cell #1) has been activated, according to whether the buffer status is larger than the threshold value. The buffer status report may be triggered in response to the buffer status exceeding the threshold value or in response to the secondary cell activated.

Here, the example in which one bearer is mapped with two cells has been described, and however, one bearer may be mapped with three or more cells. In this case, the one bearer may be divided into three or more virtual bearers.

Modification of Fourth Embodiment

A modification of the fourth embodiment will be described. In the modification of the fourth embodiment, the fourth embodiment described above is extended to the dual connectivity.

In the modification of the fourth embodiment, the plurality of specific cells include a first specific cell that belongs to a master cell group, and a second specific cell that belongs to a secondary cell group. The mapping configuration is for setting a mapping between a specific bearer and the first and second specific cells of the UE 100. The UE 100 maps the specific bearer with the first and second specific cells, based on the mapping configuration.

Figure 12:
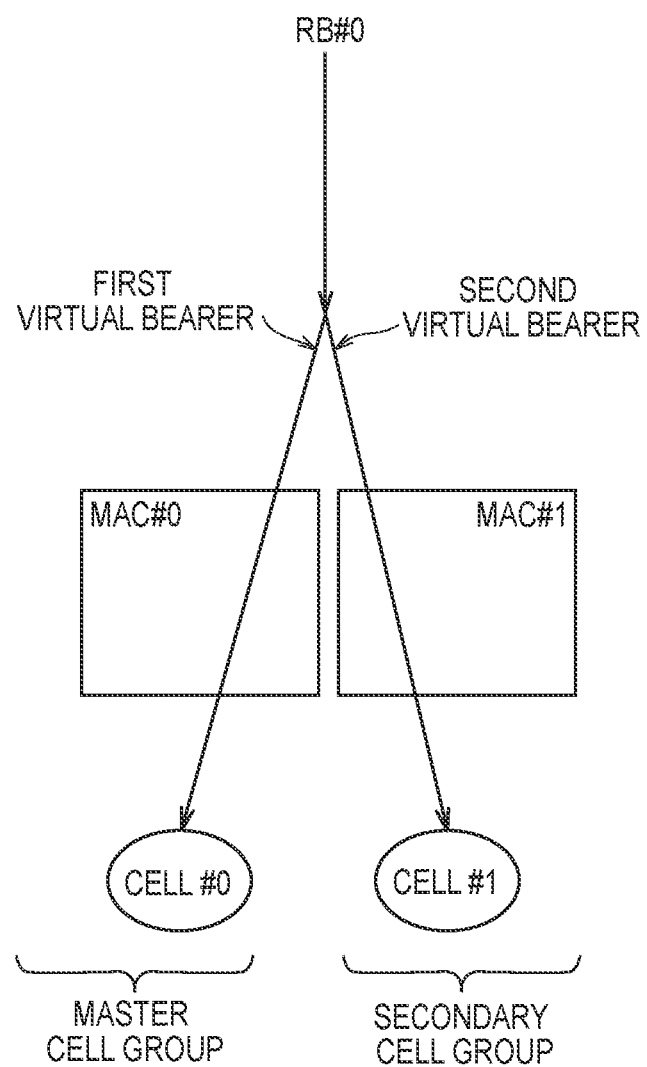
FIG. 12 is a diagram illustrating an example of the UE according to a modification of the fourth embodiment.

FIG. 12 is a diagram illustrating an example of an operation of the UE 100 according to the modification of the fourth embodiment.

As illustrated in FIG. 12, the UE 100 includes a MAC entity for the master cell group (MAC #0), and a MAC entity for the secondary cell group (MAC #1). The division of the bearer (RB #0) is performed by the PDCP entity or the RLC entity of the UE 100. The first virtual bearer is mapped with the first specific cell (Cell #0). The second virtual bearer is mapped with the second specific cell (Cell #1). Such settings may be performed by RRC signaling by the eNB 200. For example, the PDCP entity distributes data of RB #0 to the first virtual bearer (Cell #0) and the second virtual bearer (Cell #1). In the modification of the fourth embodiment, the PDCP entity provides data of the first virtual bearer to MAC #0, and provides data of the second virtual bearer to MAC #1. The other operations are similar to those in the fourth embodiment.

Fifth Embodiment

A fifth embodiment will be described with a particular focus on differences from the first embodiment to the fourth embodiment. The fifth embodiment is an embodiment relating to settings of SPS (Semi-Persistent Scheduling).

The UE 100 according to the fifth embodiment receives SPS setting information (SPS configuration) for setting the SPS from the eNB 200 by RRC signaling. The SPS setting information according to the fifth embodiment is setting information specific to the bearer or the LCG. The SPS setting information may include a bearer ID or an LCG ID. It should be noted that existing SPS setting information is setting information that is specific to not the bearer or the LCG but the UE 100. The UE 100 applies the SPS setting information to the bearer or the LCG. It is noted that the SPS setting information includes parameters such as an RNTI for SPS, an interval of resource allocation, the number of HARQ processes, a threshold for implicit setting release, and a transmission power.

An example in which the SPS setting information is setting information specific to an LCG is mainly described. For example, when receiving the SPS setting information for specifying a predetermined LCG from the eNB 200, the UE 100 may apply the SPS setting information to communication in a specific cell corresponding to the predetermined LCG.

It is thought that a plurality of bearers having similar QoS requirements (a plurality of logical channels) are allocated to the same LCG. For example, bearers #1 and #2 of voice call are allocated to LCG #1, and a bearer of web browsing or FTP is allocated to LCG #2. Under this condition, it is preferable to use an LCG-based SPS setting. This makes it possible to reduce the complexity as compared to the case of using a cell-based SPS setting or a bearer-based SPS setting.

By using the LCG-based SPS setting, it is possible to apply different SPS settings to the respective LCGs. For example, it is possible to apply an SPS setting optimized for VoLTE to one LCG, and apply an SPS setting optimized for latency reduction to another LCG.

Sixth Embodiment

A sixth embodiment will be described with a particular focus on differences from the first embodiment to the fifth embodiment. The sixth embodiment is an embodiment relating to cell activation/cell deactivation.

The UE 100 according to the sixth embodiment receives, from the eNB 200, instruction information indicating an instruction for cell activation or cell deactivation (hereinafter, referred to as "activation/deactivation instruction information"). The activation/deactivation instruction information is, for example, a type of MAC control element. The activation/deactivation instruction information is information specific to a bearer or an LCG. The activation/deactivation instruction information may include a bearer ID or an LCG ID. It should be noted that existing activation/deactivation instruction information is setting information that is specific to not the bearer or the LCG but the UE 100.

The UE 100 applies the activation/deactivation instruction information in common to all the cells mapped with the bearer or the LCG. For example, when receiving an instruction to activate a bearer or an LCG, the UE 100 activates all the cells corresponding to the bearer or the LCG. When receiving an instruction to deactivate a bearer or an LCG, the UE 100 deactivates all the cells corresponding to the bearer or the LCG.

In the sixth embodiment, the deactivation timer is set for each bearer or each LCG. The eNB 200 may set, in the UE 100, the deactivation timer together with a bearer ID or an LCG ID by RRC signaling.

An example in which the activation/deactivation instruction information is setting information specific to the LCG is now described. In this case, the activation/deactivation instruction information includes an LCG ID. By using the cell-based cell activation/cell deactivation, it is possible to reduce the complexity as compared to the case of using cell-based cell activation/cell deactivation or bearer-based cell-based cell activation/cell deactivation. However, the LCG-based cell activation/cell deactivation may be used in combination with the cell-based cell activation/cell deactivation.

However, assuming a case where one cell is mapped with a plurality of bearers or a plurality of LCGs, the following rule may be introduced. It is noted that the eNB 200 may notify the UE 100 of what kind of rule is to be used.

In the case where one cell is mapped with a plurality of bearers or a plurality of LCGs, the UE 100 activates the one cell in response to an instruction to perform cell activation on at least one of the plurality of bearers or at least one of the plurality of LCGs. The UE 100 deactivates the one cell in response to an instruction to perform cell deactivation on at least one of the plurality of bearers or at least one of the plurality of LCGs.

An example of a case where Cell #1 is mapped with LCGs #1 and #2 is now described.

First, an operation for activating Cell #1 is described. When receiving an instruction to activate LCG #1, the UE 100 activates Cell #1 even without receiving an instruction to activate LCG #2. Likewise, when receiving an instruction to activate LCG #2, the UE 100 activates Cell #1 even without receiving an instruction to activate LCG #1.

Secondly, an operation for deactivating Cell #1 is described. Even when receiving an instruction to deactivate LCG #1, the UE 100 does not deactivate Cell #1 if LCG #2 is in an activated state. Likewise, even when receiving an instruction to deactivate LCG #2, the UE 100 does not deactivate Cell #1 if LCG #1 is in an activated state. Only when receiving an instruction to deactivate both LCG #1 and LCG #2 (and also when the deactivation timer expires), the UE 100 deactivate Cell #1.

Seventh Embodiment

A seventh embodiment will be described with a particular focus on differences from the first embodiment to the sixth embodiment. The seventh embodiment is an embodiment relating to setting of DRX (Discontinuous Reception). It should be noted that while the embodiments described above are embodiments mainly directed to an uplink, the seventh embodiment is an embodiment directed to a downlink.

The UE 100 according to the seventh embodiment receives DRX setting information for setting DRX by RRC signaling from the eNB 200. The DRX setting information according to the seventh embodiment is setting information specific to a bearer, an LCG, or a TAG. The DRX setting information may include a bearer ID, an LCG ID, or a TAG ID. It should be noted that existing DRX setting information is setting information that is specific to not the bearer, the LCG, or the TAG but the UE 100. The UE 100 applies the DRX setting information to all the cells mapped with the bearer, the LCG, or the TAG.

An example in which the DRX setting information is setting information specific to an LCG is mainly described. For example, when receiving the DRX setting information for specifying a predetermined LCG from the eNB 200, the UE 100 may apply the DRX setting information to communication in a specific cell corresponding to the predetermined LCG. The UE 100 can monitor the PDCCH using a different DRX pattern for each LCG. The DRX setting information includes parameters such as onDurationTimer, drx-InactivityTimer, drx-RetransmissionTimer, longDRX-CycleStartOffset, shortDRX-Cycle, and DrxShortCycleTimer. These parameters define the DRX pattern.

Other Embodiments

In the embodiments described above, the setting method is for each bearer or LCG, but is not limited thereto. The setting may be performed for each IP flow. The IP flow is a flow of a series of packets from a specific IP address to another particular IP address. Further, the setting may be performed for a group defined by the IP flow. The group is sometimes referred to as a bearer or an LCG.

The present disclosure is not limited only to a case where the embodiments described above may be implemented independently; but two or more embodiments may be combined and implemented. For example, a part of the configuration according to one embodiment may be added to another embodiment. Alternatively, the part of the configuration according to one embodiment may be replaced by a part of the configuration of another embodiment.

In the embodiments described above, the LTE system was exemplified as the mobile communication system. However, the present disclosure is not limited to the LTE system. The present disclosure may be applied to systems other than the LTE system.

INDUSTRIAL APPLICABILITY

The present disclosure is useful in the field of mobile communication.

The invention claimed is:

1. A user equipment comprising:
a processor and a memory coupled to the processor, wherein
the processor is configured to perform a process of receiving from a base station, a message including information indicating a first logical channel associated with one or more first cells, information indicating a second logical channel associated with one or more second cells, and information associating the first logical channel and the second logical channel with a specific bearer of the user equipment,
when transmitting data of the specific bearer, the processor is configured to perform
a process of transmitting the data by using the first logical channel in response to a volume of the data not exceeding a threshold value configured by the base station, and
a process of transmitting the data by using the first logical channel and the second logical channel in response to the volume of the data exceeding the threshold value.

2. A method used in a user equipment, comprising:
receiving, from a base station, a message including information indicating a first logical channel associated with one or more first cells, information indicating a second logical channel associated with one or more second cells, and information associating the first logical channel and the second logical channel with a specific bearer of the user equipment; and
transmitting data of the specific bearer, wherein
transmitting the data of the specific bearer comprises
transmitting the data by using the first logical channel in response to a volume of the data not exceeding a threshold value configured by the base station, and
transmitting the data by using the first logical channel and the second logical channel in response to the volume of the data exceeding the threshold value.

3. A base station comprising:
a processor and a memory coupled to the processor, wherein
the processor is configured to perform a process of transmitting to a user equipment a message including information indicating a first logical channel associated with one or more first cells, information indicating a second logical channel associated with one or more second cells, and information associating the first logical channel and the second logical channel with a specific bearer of the user equipment, and
the processor is configured to perform a process of configuring a threshold value to the user equipment so that, when transmitting data of the specific bearer, the user equipment transmits the data by using the first logical channel in response to a volume of the data not exceeding the threshold value, and transmits the data by using both of the first logical channel and the second logical channel in response to the volume of the data exceeding the threshold value.

* * * * *